United States Patent

[11] 3,617,135

[72] Inventor  Hans Dieter Betz
               Mannheim, Germany
[21] Appl. No. 728,208
[22] Filed     May 10, 1968
[45] Patented  Nov. 2, 1971
[73] Assignee  Carl Zeiss-Stiftung
               Heidenheim on the Brenz, Wuerttemberg,
               Germany
[32] Priority  Feb. 20, 1968
[33]           Germany
[31]           B 96728

[54] OPTICAL ALIGNMENT METHOD AND
     ARRANGEMENT FOR PRACTICING THE
     METHOD
     4 Claims, 7 Drawing Figs.
[52] U.S. Cl. ................................................ 356/172,
                                                            350/162
[51] Int. Cl. ........................................... G01b 11/26

[50] Field of Search ........................................ 356/172,
                                                   110, 111; 350/162, 163

[56]           References Cited
               UNITED STATES PATENTS
3,240,108   3/1966   Lehan et al. .................... 356/71

Primary Examiner—Ronald L. Wibert
Assistant Examiner—T. Major
Attorney—Singer, Stern & Carlberg ABSTRACT: A method and arrangement for optical alignment of spatially separated objects in which a laser beam of substantially coherent radiation has disposed therein a phase plate producing a minimum of intensity, a diffraction diaphragm representing the object to be aligned and an observation screen on which appear the characteristics of the diffraction pattern produced by the diaphragm. Photoelectric scanning elements may be arranged in the plane of said observation screen for detecting said diffraction pattern.

PATENTED NOV 2 1971    3,617,135

INVENTOR:
Hans Dieter Betz
BY
Singer, Stern & Carlberg
Attorneys.

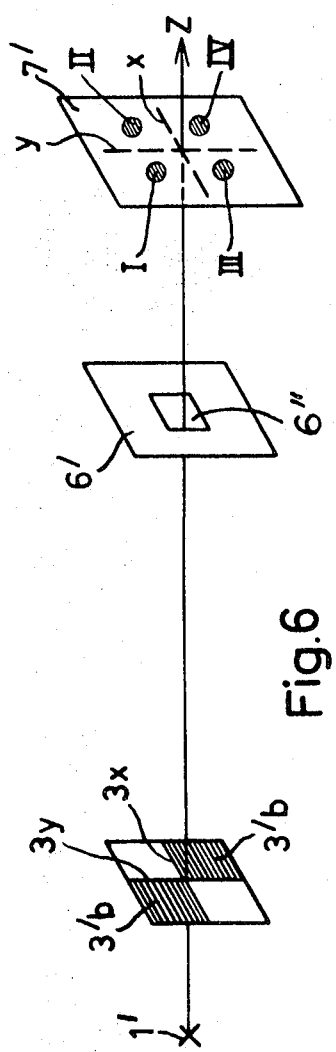
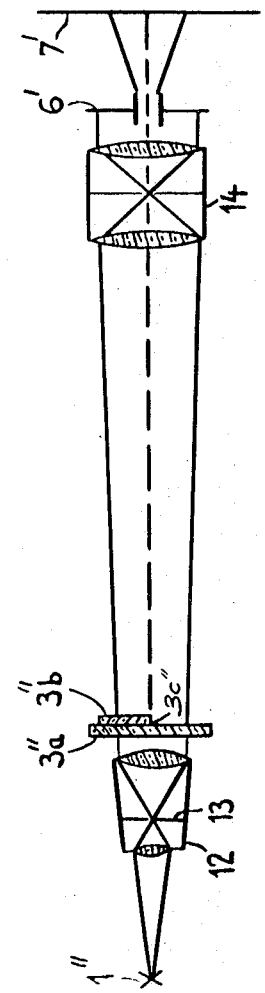

OPTICAL ALIGNMENT METHOD AND ARRANGEMENT FOR PRACTICING THE METHOD

The invention relates to a method and an arrangement for optical alignment of spatially separated objects.

With the customary adjusting methods which employ a boresight, it is only possible to obtain, at the most, accuracies of about $10^{15}$ rad.

Another conventional method which employs tensioned wires can only be used for distances which at the most do not exceed a few hundred meters.

It is also known to employ a light ray path through the zero plane of the light which is produced by the interference of two oppositely phased light bundles, for instance with the assistance of "one dimensional" phase plates (see H. Wolter, Annalen der Physik 6, 1950, pgs. 341–368).

It is an object of the invention to create an optical alignment method which permits a definite determination of target displacements of about 0.01 mm. at distances up to a few kilometers ($10^{18}$ rad).

According to the invention this is made possible by employing a laser beam diffracted with the assistance of a phase element and by disposing the objects to be aligned at the resulting minimum intensity of this laser beam.

The fine adjustment of the targets then takes place preferably by observation of the symmetry condition of a diaphragm diffraction pattern. The detection of the diffraction pattern may take place visually or also with the assistance of photoelectric scanning devices.

The advantages of the method of the invention reside not only in the simplicity and the accuracy obtained, but also in the fact that the geometry of a corresponding arrangement may be selected in a far-reaching variability and that an alignment may be obtained for short distances and also for distances which extend over a number of kilometers with almost the same accuracy.

With these objects in view the invention will hereinafter be described in greater detail with reference to the accompanying drawings, in which.

Figure 3:
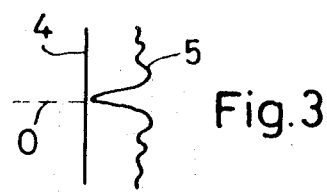
Figure 5:
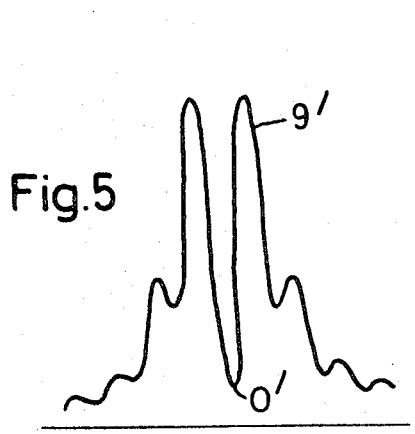
Figure 4:
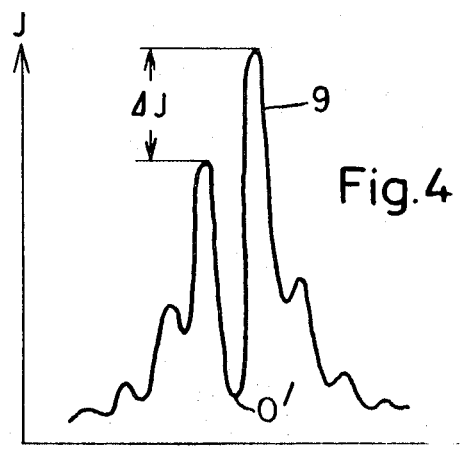

FIGS. 3, 4, and 5 illustrate intensity characteristics;

FIG. 6 illustrates diagrammatically a two-dimensional alignment arrangement, and FIG. 7 presents the way to use an additional telescope with or without a spatial filter. A spatial filter can also be utilized at the end of the considered system.

Figure 1:
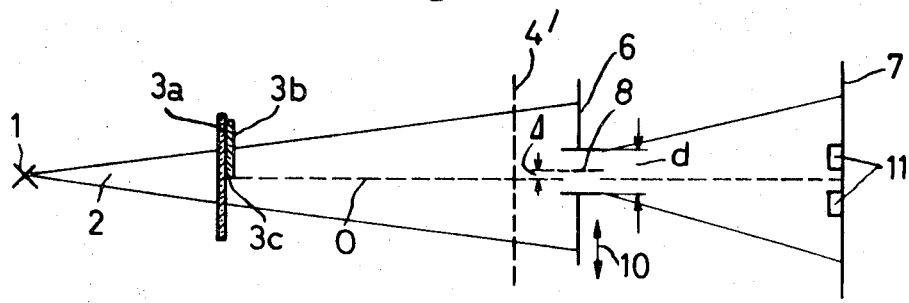
FIG. 1 illustrates diagrammatically and in a side elevation view the principle construction of an arrangement for practicing the method of the invention.

Referring to FIG. 1, a laser beam source 1 emits a narrow bundle of rays 2 of a substantially coherent radiation of constant amplitude. This bundle of rays with the assistance of a phase plate of conventional construction and which, for instance, comprises a transparent carrier 3a having arranged thereon a $\lambda/2$ layer 3b, is split in two coherent parts of opposite phase.

Figure 2:
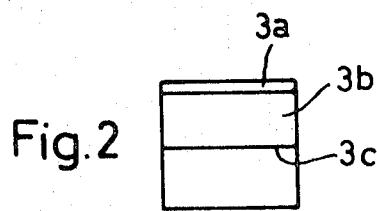
FIG. 2 illustrates an elevation view of a so-called "one-dimensional" phase plate.

FIG. 2 illustrates in an elevation view such a so-called "one-dimensional" phase plate which is employed during an alignment of targets in one dimension extending about perpendicular to the plane of the drawing. The boundary line of the $\lambda/2$ layer 3b is designated with 3c (range of the phase transition). In FIG. 1 such a phase plate, by way of example, is vertically inserted into the path of the bundle of rays in such a manner that the boundary line 3c extends perpendicular to the plane of the drawing so that the bundle of rays 2 is substantially split into halves.

In any optional distance in rear of the phase plate is produced in view of Fresnel's diffraction phenomenon an intensity distribution of the radiation which in accordance with the boundary line 3c of the $\lambda/2$ layer 3b has a central absolute minimum of intensity zero.

This can easily be proven by an interception screen 4 which is inserted into the path of the bundle of rays, see the dash line 4' in FIG. 1. In FIG. 3 an example of the characteristic of the intensity is indicated with 5.

In the arrangement illustrated in FIG. 1 is also shown the arrangement of a diaphragm 6 which symbolizes the target to be aligned. This diaphragm 6 is provided with a slit having the width $d$ (the length of the slit extends perpendicular to the plane of the drawing) and is arranged at the point of the minimum intensity zero of the radiation. The diffraction pattern produced on this diaphragm 6 is observed on the projection screen 7. If now the center line 8 of the slit in the diaphragm 6 has a small distance $\Delta$ from the course of the minimum line zero, then one observes on the screen 7 an intensity characteristic 9 as shown by way of example in FIG. 4. Thereby the position of the central minimum zero' corresponds to the position of the line zero in FIG. 1. The two maxima of the intensity which are adjacent to the central minimum zero' differ from each other for example by an amount $\Delta J$.

If one now displaces during the observation of the diffraction pattern on the screen 7 the diaphragm 6 in the direction of the arrow 10 until a symmetrical diffraction pattern is obtained, substantially as it appears in FIG. 5 and is indicated with 9' ($\Delta J=0$), then the center line 8 of the slit in the diaphragm 6 and the minimum line zero are brought into coincidence with each other and this means that the target represented by the slit has been aligned with the reference plane zero.

The evaluation of the intensity conditions which as described relies on a visual observation may also be accomplished with the assistance of photoelectric receivers 11 (FIG. 1) which are relatively slidable with respect to the laser beam path and may comprise well-known "multipart" photo elements.

It is believed to be obvious that an alignment of targets as illustrated in FIG. 1 and which takes place in one predetermined dimension may also be performed by rotating all parts about an angle of 90° so that the alignment takes place in a dimension at right angles to the first mentioned dimension.

The principle of the present invention permits, however, to make use of the advantage which arises when both these features are employed simultaneously in one arrangement.

Such a two-dimensional alignment arrangement is illustrated by way of example in a diagrammatic perspective view in FIG. 6. In this FIG. 6 the laser beam source is designated with . The "two-dimensional" phase plate 3' has two square zones 3'b covered each with $\lambda/2$ layers which are relatively offset to each other in such a manner that two boundary lines 3x and 3y are produced which are perpendicular to each other in a plane extending at right angles to the center axis of the laser beam path. It is on these boundary lines where the phase transitions of 180° occur. If one now places in the minimum intensity (designated by the axis Z) of the Fresnel diffraction pattern a diaphragm 6' having a square aperture 6'', then one is able to observe on the projection screen 7' a reticle X, Y which corresponds to the path of the two intersecting axes of the intensity zero of the diffraction pattern, as well as four maximum intensities I, II, III, and IV.

If the center of the aperture of the diaphragm 6'—which diaphragm 6' represents the target to be aligned—is correctly aligned upon the axis Z, then the diffraction pattern appearing on the screen 7' is completely symmetrical and the four maxima of intensity I, II, III, and IV have all the same size. Otherwise similar asymmetry effects occur as have been described in connection with the embodiment according to FIG. 1.

The asymmetry effect during the adjustment of the diaphragm is a direct measure of the deviation from the reference lines upon which the adjustment is made.

For illustrating the size of this asymmetric effect it may be stated, for example, that in an arrangement according to FIG. 1 in which the width of the slit 6 is $d=1$ mm. and in which the displacement of this slit is $\Delta=0.01$ mm. in an optional distance from the source of the rays 1 there is obtained an asymmetric intensity $\Delta J/J$ of about 10 percent.

Since it depends solely concerning the asymmetric effect to be observed upon a relative displacement of the diffraction slit and the minimum intensity of the structural laser beam, it is obvious that the diffraction slit and the observation screen may also be mounted fixedly and that one or more phase plates—which now represent the targets to be aligned—are inserted into the laser beam without causing the described method to be changed in any manner.

The last-named arrangement has now the additional advantage that a plurality of objects may be aligned with a single laser arrangement.

The divergence of the laser beam in a manner known may be reduced by the insertion of a telescope 12 focused to infinity into the laser beam and in an inverted position, i.e. with its ocular facing the source of the laser beam as illustrated in FIG. 7.

In the arrangements in accordance with the invention, the telescope 12 is preferably inserted between the source of the laser beam 1'' and the phase plate 3a'', 3b'', 3c'' since otherwise the minimum of intensity which is being produced is also enlarged (FIG. 7). It is of advantage to insert a spatial filter 13 into the telescope 12 as shown in FIG. 7 in order to mask nonparallel distorting rays. A corresponding spatial filter 14 can be used close to the plane of detection as indicated in FIG. 7 in order to purify the minimum and to improve the alignment accuracy.

Obviously, the method of the present invention is not limited to the alignment of targets as described in the above embodiments, but may be employed with advantage wherever any objects in an arrangement have to be aligned accurately with respect to one another, for instance during the adjustment of focusing elements of a linear accelerator, during the adjustment of target marks on geodetical measurements, during the guidance of excavation machines or other moving objects, during the coupling of flying objects (space vehicles), etc. In addition, the observation of "fixed" objects should be mentioned, in order to detect eventual small movements.

What I claim is:

1. A method of optically aligning a laser source, a phase plate and an object containing an optical diaphragm, comprising the steps of producing a primary diffraction pattern containing a central absolute intensity minimum by projecting a laser beam through the phase plate and splitting said laser beam into fractional beams in phase opposition with each other, projecting said diffraction pattern toward a detection plane, producing a secondary diffraction pattern having four principal symmetrically arrayed intensity maxima at said detection plane by inserting said diaphragm in alignment between the phase plate and the detection plane, and moving said phase plate and diaphragm relative to each other transversely of said laser beam to equalize the intensity of said four maxima, whereby alignment is achieved.

2. An apparatus for optically aligning a laser source, a phase plate and an object containing an optical diaphragm, comprising in the following order: a laser source emitting substantially coherent radiation, a phase plate in the path of the laser beam for splitting said laser beam into fractional beams in phase opposition and thereby producing a primary diffraction pattern containing a central absolute intensity minimum, said optical diaphragm in the laser beam producing a secondary diffraction pattern having four intensity maxima, means for causing relative displacement between said diaphragm and phase plate transversely of the laser beam, and detector means for detecting differences in intensity between said four intensity maxima.

3. An apparatus according to claim 2, including a telescope disposed in said laser beam between said laser source and said phase plate for reducing the divergence of said laser beam.

4. An apparatus according to claim 3, including a spatial filter in said telescope and another spatial filter close to the detector means for purifying the beam and improving the alignment accuracy.

* * * * *